Oct. 6, 1959  NOBURO SASAKI  2,907,455
APPARATUS FOR THE RECOVERY OF FINE CARBONIC
FUEL PARTICLES FROM SLURRY
BY ULTRASONIC WAVES
Filed Jan. 4, 1957
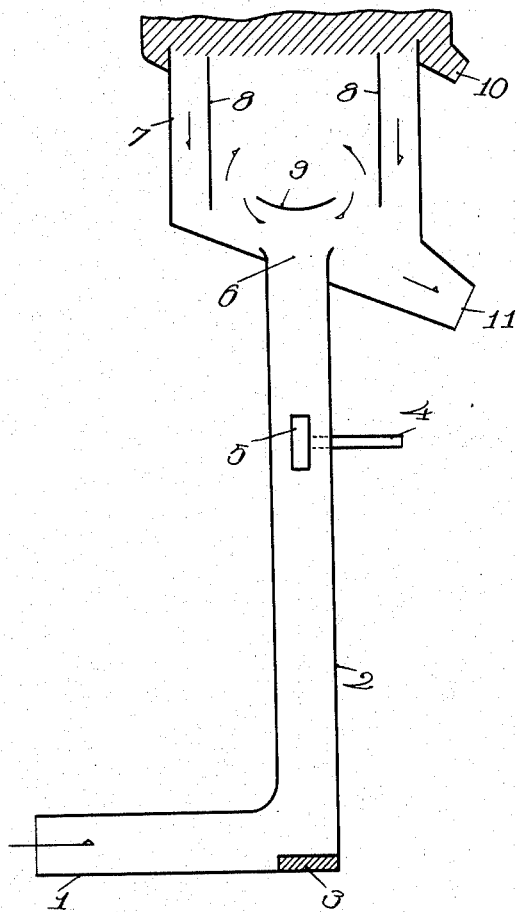
INVENTOR:
NOBURO SASAKI
BY
Richardson, David and Verdon
ATTORNEYS.

United States Patent Office 2,907,455
Patented Oct. 6, 1959

2,907,455
APPARATUS FOR THE RECOVERY OF FINE CARBONIC FUEL PARTICLES FROM SLURRY BY ULTRASONIC WAVES

Noburo Sasaki, Tokyo, Japan

Application January 4, 1957, Serial No. 632,542

Claims priority, application Japan January 17, 1956

1 Claim. (Cl. 209—5)

This invention relates to an apparatus for recovering solid fuel in refined condition, being separated from other materials than carbonic material by the use of ultrasonic wave. It has been found when ultrasonic waves are applied to a system of which the major component is liquid, having a suspension of fine solid fuel grains such as coal, brown coal, coke, semi-coke and other carbonic matters and the particles carrying other materials such as stone, clay and other mineral matters, the refined fine carbonic fuel particles are recovered, having been separated from other material carrying particles. So long as the fine carbonic fuel particle exists in the state mentioned above, it must be considered as a fuel of inferior quality containing other material carrying particles as ash.

There are several known industrial methods of separating fine carbonic fuel particles from other materials both suspended in medium, that is, for instance, the air coal selection method known as the dry system and the coal flotation or "Convertol" method known as the wet system.

This invention may be referred to as a wet system, because the addition of water to the solid material is required, if the material to be treated is in dry state. The invention, however, is thoroughly different from other well known methods, since fine carbonic fuel particles can easily be recovered from a slurry, having a suspension of fine carbonic fuel and of other materials in size less than 1 mm., solely by introducing irradiation of ultrasonic waves to the system without applying any other mechanical working.

The problem, how to recover the carbonaceous part from slurry discharged from a coal washing plant which is commonly installed in the collieries, has such a significance as the quantity of usable coal to be recovered from the slurry is not negligible. The treating process of slurry so far known, for instance, is to concentrate the suspension of solid matter, namely, carbonaceous and other materials in liquid usually discharged from a coal washing plant of which the percentage in relation to the liquid is generally less than 2%, raising the percentage to the range of 20% to 30% in a thickener. Thereafter, the thickened mass is again treated by the coal flotation or Convertol method to recover the usable solid fuel, being separated from other materials. Despite the fact that the cost of equipment and the operational cost of these conventional methods mentioned above amount a great deal, the satisfactory recovery of usable solid fuel from the slurry of washing plant is still infeasible and rather considerable quantity of solid fuel is drained out into the refused water as a result of incompleteness of such processes.

The apparatus according to the invention requires only a small compact equipment with a minimal power consumption and, moreover, the efficiency of the apparatus is so nearly perfect as to recover almost all the usable solid fuel without loss of any consequence.

The following description may help to understand the invention:

The slurry as usually discharged from a coal washing plant, flows continuously through a pipe or a container and ultrasonic waves are irradiated directly to the slurry which has a suspension of carbonaceous and other materials as described above. The irradiation of ultrasonic waves causes cavitation and agitation in the slurry. As soon as ultrasonic waves are irradiated into the slurry, the carbonaceous part of slurry is rapidly coagulated and other materials, which are another component of the slurry, remain dispersedly suspended in the system as before. The slurry has now changed its constitution to a mass which is composed of water, coagulated mass of fine carbonaceous matters and other material carrying particles. This mass is then, if necessary, treated in the following process by some other means, say, the mechanical agitation or compressed air blow-in, to provide numerous minute bubbles in the said same. The air bubbles thus blown into the mass adhere only to the coagulated mass of fine carbonaceous matters, giving buoyancy to the mass, and the coagulated mass consequently begins to float upwardly in the system while the other materials subside having no adhesion of bubbles. The usable carbonaceous matter of low ash and moisture content is then recovered when these floating coagulated masses are collected and charged into a filter or centrifugal device to undergo mechanical dewatering.

The cause of the coagulation of fine carbonaceous matter which occurs when ultrasonic waves are irradiated to the system, may be considered as directly attributable to a combination of vibration of carbonaceous particles, repulsion and attraction between adjacent particles, and radiation pressure caused by the sonic waves. Furthermore, as fine carbonaceous material in the mass has a certain surface property, the coagulation of carbonaceous material takes place rapidly being accelerated by the adhesion of numerous minute bubbles resulting from cavitation which is commonly caused by the irradiation of ultrasonic waves. The size of a coagulated mass of fine carbonaceous matter thus formed is several hundredfolds larger than the original individual particles composing the coagulated mass. The particles carrying other material than carbonaceous matter stay in the system in the dispersed state same as before where no irradiation of ultrasonic waves was initiated.

The invention distinguishes itself from the other known methods such as coal flotation or Convertol in the features described as follows:

(1) The apparatus according to the invention effectively performs on the solid carbonic fuel of any property, in other words, any grade of coalification, in grain size less than 1 mm. to minimum and on a mass consisting of water, fine carbonic matter and other materials of any pH value. The apparatus is also usable with a mass which has suspended fine solid particles in a density up to 50%.

(2) The apparatus according to the invention performs solely with the irradiation of ultrasonic waves into a mass and no other mechanical working is necessary.

(3) The apparatus according to the invention may be used on a mass which has a suspension of solid materials in density of less than 2% of the total weight of the mass, while other processes need the pretreatment of thickening the mass to raise the rate of density of the mass to the range of 20 to 30%.

(4) The apparatus according to the invention calls for small equipment as the slurry in a flowing state is treatable in large volume in a short lapse of time and, moreover, the action of coagulation takes place instantaneously and continuously through microagitation and cavitation of ultrasonic waves.

The most important factor for the industrialization of this invention is to find out the best frequency of ultrasonic wave which can result in the rapid coagulation of fine solid carbonic matter in an appropriate size. The following description illustrates the experiments performed for the selection of frequency suitable for satisfactory performance of the invented method:

EXPERIMENT 1

Ultrasonic waves in frequency of 24 k.c./s. was irradiated to the coal slurry having 3% suspension of fine solid matter which is composed of 45.2% of fine coal grains (specific gravity: less than 1.4) and the balance of other material carrying particles in size less than 0.5 mm., without adding oil emulsion. No coagulation has taken place and consequently almost no float was observed. Fine coal grain in the percentage of only 1.3 was collected out of 45.2% mentioned above.

EXPERIMENT 2

The same material as applied to the Experiment 1 was treated by ultrasonic waves in frequency of 1,200 kc./s. without adding emulsion. The result was slightly better than the former experiment collecting 2.5% of total fine coal grain.

EXPERIMENT 3

Using the same material as the Experiment 1 and also adding no emulsion, ultrasonic waves in frequency of 400 kc./s. was irradiated. The results were as follows:

|  | Percent |
|---|---|
| Original ash content of raw material | 32.3 |
| Ash content of collected fine coal grain | 8.4 |
| Yield of fine coal grain | 72.4 |
| Ash content of other material carrying particles remained in water | 80.37 |

After several successive experiments thereafter performed it was consequently found that the frequency in the range of 200 kc./s. to 1 mc./s. and especially 400 kc./s. is suitable to have rapid coagulation of fine carbonic fuel particle such as coal, brown coal, coke and semi-coke, being separated from other materials. Both of these fine solid fuel and other materials treated at these experiments as raw material had the size less than 1 mm.

The condition under which ultrasonic waves in the said frequency is irradiated, is another important factor for the industrialization of the invention. It is more preferable to irradiate ultrasonic waves to the water flowing continuously through a pipe when the large volume of water to be treated and the short lapse of time for the irradiation are required, than to produce coagulation in a certain limited volume of stationary water in a container.

The transmission of a wave in a system of finite dimension will eventually result in the reflection of the wave in the system and the reflected wave moves in the direction of the primary source. Since there is a continuous wave motion a state of equilibrium, which is known as a standing wave, may eventually be reached. The production of this wave state is not desirable and not found in the present apparatus.

When ultrasonic waves are irradiated in right or slantwise angle to the axis of a pipe, standing waves are produced by progressive waves and waves reflected from the inner surface of pipe to decrease the efficiency of agitating motion, and at the same time the irradiation of waves for a certain lapse of time on an object becomes impossible as the limited sonic field caused by both improper irradiating angle and rectilinear progressiveness of the waves does not allow to increase the rate of water flow to the required speed.

The above description explains that two factors, namely, the direction of wave to be irradiated to water and the lapse of time necessary for coagulating suspended fine carbonic particles in the water, are very important factors for the efficient use of the apparatus according to the invention. It is, therefore, proposed to fit the ultrasonic transducer to match these conditions; the transducer is fitted as to apply the wave irradiation parallel to the direction of pipe's longitudinal axis.

The pipe, thereafter, is adjusted to the required length as to enable the coagulation by irradiating the wave for a necessary lapse of time on an object. The volume of water to be treated in the pipe is also controlled by the rate of flow. By arranging the direction of the wave irradiation parallel to the major pipe axis, the piling up of particles on the inner surface of pipe is prevented, which is otherwise inevitably effected by radiation pressure of waves and withstands smooth flow of the slurry. Furthermore, such a measure can minimize intervention caused by reflective waves.

As these experiments are performed in the ways as mentioned above, another applied method of the invention adaptable to the product of usual coal flotation was found. By the conventional coal flotation process, fine coal grains in coal slurry are floated upwards, adhering to oil froths introduced in the system. The dewatering from the system thus prepared, however, is only possible by troublesome application of some filtering processes. If ultrasonic waves are irradiated to such a system which consists of water and oil froths with adhesion of coal grains on its surface, fine coal grains then coagulate instantly being detached from oil froth surface. The oil froths still remaining in the water float upwards by obtaining more buoyance as the froth size increased by the fusion of several froths due to cavitation of ultrasonic waves. The dewatering of the system to recover coagulated mass of fine coal is, thereafter, easily performed by mechanical treatment of which detail is already described. While some additional cost is required at the conventional flotation process for procuring a deforming agent which is to be applied for facilitating the filteration process thereafter followed, the application of ultrasonic waves in the apparatus of this invention for defrothing and recovering fine coal grains is undisputably economical.

The apparatus of the present invention is described in detail by referring to the drawing herewith attached wherein:

The figure is a sectional view of the apparatus found to be the most suitable for carrying out the present invention.

The figure illustrates an apparatus which is most suitable for utilizing the method according to the invention. Slurry enters the open end of the pipe 1 preferably under pressure. The wave from a ultrasonic transducer fitted at 3 is irradiated to the water in the direction parallel to the major axis of the pipe part 2 to coagulate fine carbonic fuel particles as soon as the water reaches the part 2. The production of cavitation bubbles by irradiation of ultrasonic waves to the liquid is widely known phenomenon. Numerous minute bubbles which are thus produced by sonic irradiation from 3 adhere to the suspended fine carbonic particles to facilitate the coagulation in the pipe 2.

The slurry thus having coagulated masses of fine carbonic particles formed in it flows upwardly to a compressed air discharge member 5 connected to an air supply pipe extending through one side of the pipe 2. This compressed air must originate externally of the pipe as to avoid the disintegrating effect of ultrasonic waves which is known one of the most characteristic actions of the wave.

Now, the compressed air is introduced into the pipe from 5 and air bubbles thus produced adhere to the coagulated masses of fine carbonic particles giving them more buoyancy. The water containing coagulated masses of fine carbonic particles with accelerated buoyance enters through the entry 6 into the container 7. The container 7 has a larger diameter relative to the pipe 2 which has the direct connection to the container 7.

A cylinder 8 and a baffle plate 9 are provided in the container 7 of which the former regulates the floating coagulated masses and the latter settles the turbulent flow of water. The current coming up through the pipe 2 lessens its speed to the degree almost stationary when it reaches the container because of the latter's wider dimension and only the coagulated masses of fine carbonic particle comprised in the water float upwardly supported by their accelerated buoyancy and the still remaining weak upward current. The water having the floating coagulated masses overflows from the top of the container 7 and the coagulated masses of fine carbonic fuel particle are recovered, being screened at the outlet 10. The other material carrying particles in the water subside when the speed of upward current is adjusted to fall behind the sedimentation rate of the particle and is drained out from the outlet 11 together with water. The ratio of the sectional area of two mouths of outlets 10 and 11 must be arranged in sizes as to enable to overflow some of water containing coagulated masses in it from the top outlet 10 and to drain the rest of water containing the refuses from the bottom 11.

The cylinder 8 is arranged as being adjustable its height or depth by moving respectively the upper or bottom ends of the cylinder. By the said mechanical arrangement accompanied with the regulation of upward current in the container 7, the quality grade of fine carbonic fuel particle to be recovered and the separating condition of the float and subsidence are adjustable. As the upward current movement between wall of the container 7 and cylinder 8 is near nil, quite a few fine particles of carbonic fuel which eventually fail to coagulate in passing through the pipe part 2 and a minor quantity of particles of other materials may subside and come down to the bottom of the container through the path between 7 and 8. The fine carbonic fuel particles thus precipitated are caught by coming up coagulated masses around the entry 6 of the container where sonic irradiation is still active, and the precipitated other material carrying particles are drained out from the outlet 11 as a refuse together with water.

The invented apparatus further enables one to recover the materials of low specific gravity such as coal, stone and clay being separated from the materials of high specific gravity like pyrite, pyrite sinter and copper slag when all these materials are comprised in water as suspension. The separation medium for heavy media process of coal preparation, for instance, which is overflown from a heavy media container and is screened to collect clean coal as a main product, having a suspension of pyrite sinter accompanied by minute fine coal grain, stone or clay, undergoes the action of the apparatus of this invention and the separation medium of high specific gravity, namely, pyrite sinter, and the materials of low specific gravity such as coal, clay and stone are respectively collected, being separated, the former as a sediment and the latter as a float.

The following examples of experiment performed in industrial scale may better illustrate the invention:

*Example 1*

The equipment used for this industrial experiment consists mainly of a pipe designed as in the drawing to which a transducer with a power of 200 w. was fitted at the place indicated as 3 in the said drawing. The current speed of the coal slurry to be treated was adjusted to enable to process 10 m.$^3$/h. The coal slurry to be charged, of which the major portion is water, has 5% wt. of suspended fine solid matter in size less than 0.5 mm. and this solid matter contains 31.2% of ash. After adding tar at the rate of 0.08% wt. based on the solid matter to the slurry, ultrasonic waves in frequency 420 kc./s. were irradiated to the system. The yield of near-clean coal with ash content of 8.7% which was collected as a float, was at the rate of 69.3% to total solid matter. The ash content of 71.6% was confirmed in the refused solid matter after the finished experiment.

*Example 2*

The same equipment as the above experiment was used. The separation medium for the heavy media process of coal preparation which was already once applied for the coal preparation and had 3.23% of suspended solid material, namely, the mixture of 89.3% wt. of heavy medium and 10.7% of other materials of low specific gravity such as coal, stone and clay, was used at this industrial experiment as raw material. The irradiation of ultrasonic waves in frequency of 420 kc./s. was carried out to the said medium and the heavy medium was recovered as a sediment so clean as to have only 0.3% content of other materials. The materials of low specific gravity which were simultaneously collected at the experiment have contained less than 0.1% of heavy medium.

What I claim is:

An apparatus for the recovery of fine carbonic fuel particles from slurry comprising a horizontally extending slurry inlet pipe, a second pipe extending vertically from one end of said inlet pipe, a vertically extending container having its lower end in communication with the upper end of said second pipe, an enlarged portion at the upper end of said container, a discharge outlet extending from the lower edge portion of said enlarged portion of said container, a drain outlet at the lower edge portion of said container, a vertically extending open-ended cylinder mounted in spaced relation to the side walls, bottom and enlarged portion of said container, an ultrasonic transducer mounted in the lower end of said second pipe, said transducer being directed parallel to the vertical axis of said second pipe, a compressed air discharge member centrally positioned in said second pipe in spaced relation to the upper end thereof, an air supply pipe extending from said air discharge member through one side of said second pipe, and a baffle centrally positioned in the lower end portion of said cylinder immediately above said second pipe.

References Cited in the file of this patent

UNITED STATES PATENTS

| | | |
|---|---|---|
| 2,093,898 | Taplin | Sept. 21, 1937 |
| 2,105,101 | Stelley | Jan. 11, 1938 |
| 2,426,839 | Morris | Sept. 2, 1947 |
| 2,766,881 | Westervelt | Oct. 16, 1956 |

FOREIGN PATENTS

| | | |
|---|---|---|
| 508,675 | Great Britain | June 26, 1939 |
| 78,480 | Netherlands | July 15, 1955 |

OTHER REFERENCES

Article, "Ultrasonic Desliming and Upgrading of Ores," S. C. Sun et al., "Mining Engineering," June 1956, pp. 639–644.

Wood, "Supersonics," Brown Univ., R.I., pp. 73, 74, published March 1939.